US009361601B2

(12) United States Patent
Grow et al.

(10) Patent No.: US 9,361,601 B2
(45) Date of Patent: Jun. 7, 2016

(54) SYSTEMS AND METHODS FOR LOCKING AND DOCKING

(71) Applicant: Kiosk Information Systems, Inc., Louisville, CO (US)

(72) Inventors: Roger H. Grow, Lafayette, CO (US); Richard L. Malone, Lafayette, CO (US); Charles Newsom, Littleton, CO (US)

(73) Assignee: Kiosk Information Systems, Inc., Louisville, CO (US)

( * ) Notice: Subject to any disclaimer, the term of this patent is extended or adjusted under 35 U.S.C. 154(b) by 206 days.

(21) Appl. No.: 14/044,714

(22) Filed: Oct. 2, 2013

(65) Prior Publication Data

US 2014/0094967 A1 Apr. 3, 2014

Related U.S. Application Data

(60) Provisional application No. 61/708,913, filed on Oct. 2, 2012.

(51) Int. Cl.
| | |
|---|---|
| *G06Q 10/08* | (2012.01) |
| *G07F 17/10* | (2006.01) |
| *G06Q 20/18* | (2012.01) |
| *G07F 5/26* | (2006.01) |
| *G07C 9/00* | (2006.01) |

(52) U.S. Cl.
CPC .............. *G06Q 10/087* (2013.01); *G06Q 20/18* (2013.01); *G07F 5/26* (2013.01); *G07F 17/10* (2013.01); *G07C 9/00896* (2013.01)

(58) Field of Classification Search
USPC .......................................................... 340/5.5
See application file for complete search history.

(56) References Cited

U.S. PATENT DOCUMENTS

| | | | | |
|---|---|---|---|---|
| 7,244,138 | B2 * | 7/2007 | Sasame ................ | H01R 13/629 439/378 |
| 7,658,615 | B2 * | 2/2010 | Ting ..................... | G06K 7/0021 439/541.5 |
| 7,839,289 | B2 * | 11/2010 | Chung .................. | G01S 5/0018 340/10.4 |
| 8,159,349 | B2 * | 4/2012 | McAllister ............ | B65C 9/1865 340/10.51 |
| 8,917,159 | B2 * | 12/2014 | McAllister ........... | G06Q 10/087 340/10.51 |
| 2004/0143505 | A1 * | 7/2004 | Kovach ................ | G06Q 10/087 705/23 |
| 2008/0150684 | A1 * | 6/2008 | Gartner ................. | E05B 47/06 340/5.53 |
| 2010/0228405 | A1 * | 9/2010 | Morgal .................. | B62H 3/02 701/2 |
| 2014/0094967 | A1 * | 4/2014 | Grow ..................... | G07F 17/10 700/241 |
| 2014/0316918 | A1 * | 10/2014 | Zaniker .............. | G06Q 30/0645 705/21 |
| 2015/0088694 | A1 * | 3/2015 | Ackerman ........... | G06Q 10/087 705/26.62 |

* cited by examiner

*Primary Examiner* — Brian Miller
(74) *Attorney, Agent, or Firm* — Faegre Baker Daniels LLP

(57) ABSTRACT

Embodiments of the present invention relate generally to a modular system for facilitating automated transactions. Specifically, in some embodiments a modular system includes a plurality of lock modules that are controlled by one or more primary lock control boards. The lock modules control access to products or services through one or more daughter boards.

13 Claims, 9 Drawing Sheets

SYSTEMS AND METHODS FOR LOCKING AND DOCKING

CROSS-REFERENCE TO RELATED APPLICATIONS

This application claims priority to U.S. Provisional Application No. 61/708,913, filed on Oct. 2, 2012. The contents of that application are incorporated herein by reference for all purposes.

TECHNICAL FIELD

Embodiments of the present invention relate generally to systems and methods for facilitating automated transactions. In particular, embodiments of the present invention relate to a system employing a series of docking modules that control access to goods or services.

BACKGROUND

Traditional transactions involve a customer directly interacting with an employee, such as a cashier. In many traditional transactions, for example, renting a product, employees are required to repeatedly intake and record data regarding the rental when the customer receives the product and when the customer returns the product. Requiring on-site personnel increases costs and limits locations for transactions.

SUMMARY

According to some embodiments, a modular system includes a system computer in communication with one or more Primary Lock Control Boards. Each Primary Lock Control Board communicates with multiple Lock Control Boards, which in turn communicate with a plurality of Daughter Boards. A Primary Lock Control Board, either alone or in combination with the system computer, authorizes a transaction and records data pertinent to that transaction. The Primary Lock Control Board transmits a signal to a Lock Control Board, which instructs its Daughter Boards to release an item to a customer.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Embodiments of the present invention relate generally to a modular system for facilitating automated transactions. Specifically, in some embodiments a modular system includes a plurality of lock modules that are controlled by one or more primary lock control boards. The lock modules control access to products or services. The modular system enables customers to access the products or services, for example, to check out and return a tool, without requiring the customer to fill out forms and without requiring an employee to intake and process customer information.

Exemplary System Architectures

Figure 1:
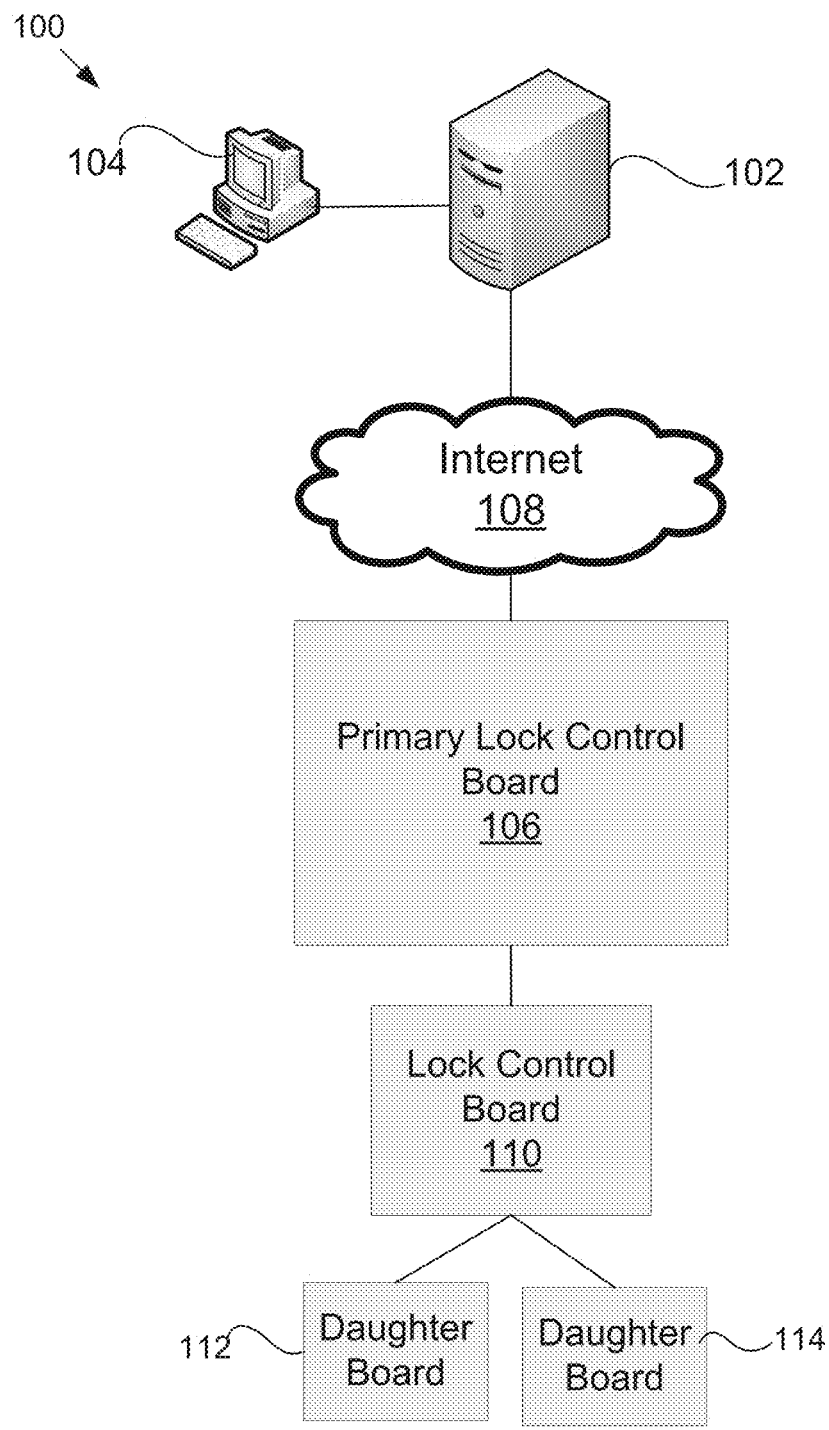
FIG. 1 illustrates a modular system for facilitating automated transactions, according to embodiments of the present invention.

As shown in FIG. 1, a modular system 100 includes a system server 102 and a system computer 104. As described below in more detail, in some embodiments the system server 102 and/or the system computer 104 are used to maintain the modular system 100 (e.g., verify that other modular components are properly functioning) and/or oversee automated transactions (e.g., verify customer access information and update databases). The system server 102 may be any standard data server and the system computer 104 may be a PC, laptop, etc. In some embodiments, the system server 102 and/or system computer 104 may form part of a kiosk for customer interaction or may host a website for receiving customer input.

In FIG. 1, the system server 102 communicates with a Primary Lock Control Board (PLCB) 106 through a network 108, such as the Internet. In some embodiments, the system computer 104 communicates with the PLCB 106 through the network 108. The network 108 may be any communications network, such as a cellular network, an intranet, a publically-switched telephone network, etc. While only one PLCB 106 is shown in FIG. 1, it is intended that a plurality of PLCBs 106 may be employed. In some embodiments, the PLCB 106 has the ability to read ambient temperature, to switch between multiple power sources, and/or to switch power on and off at any one of a plurality of connections (e.g., voltage inputs of various magnitudes). In those embodiments, the PLCB 106 may report voltage and/or amperage readings for power sources. The PLCB 106 may also include one or more input/output ports that can initiate or terminate power transmittal to external devices. For example, the PLCB 106 could initiate and/or terminate power for LCD displays, wifi or cellular cards, GPS transceivers, external lighting, etc., to conserve power or to restrict usage.

Still referring to the embodiments in FIG. 1, a Lock Control Board (LCB) 110 communicates with the PLCB 106 and with Daughter Boards 112, 114. While only one LCB and two Daughter Boards are shown in FIG. 1, it is intended that a plurality of LCBs may be used with each PLCB and a plurality of Daughter Boards may be employed with each LCB. For example, in some embodiments, an LCB includes four Daughter Boards. As described below in more detail, the LCB 110 and/or Daughter Boards 112, 114 may be incorporated into a docking module and the Daughter Boards 112, 114 may control various functions of the docking module. The LCB 110 instructs Daughter Boards 112, 114 to perform particular functions and reports data from the Daughter Boards 112, 114 to the PLCB 106. For example, Daughter Board 112 may operate a locking mechanism and Daughter Board 114 may operate a data reader or identification sensor, such as an RFID reader. Each Daughter Board 112, 114 transmits data back to the LCB 110 (e.g., indicating the lock was successfully released and transmitting data read from an RFID chip) which transmits the data to the PLCB 106. As also described below in more detail, the PLCB 106 may use that data for local operations (e.g., updating a user interface) and/or may transmit the data to the system server 102.

Figure 2:
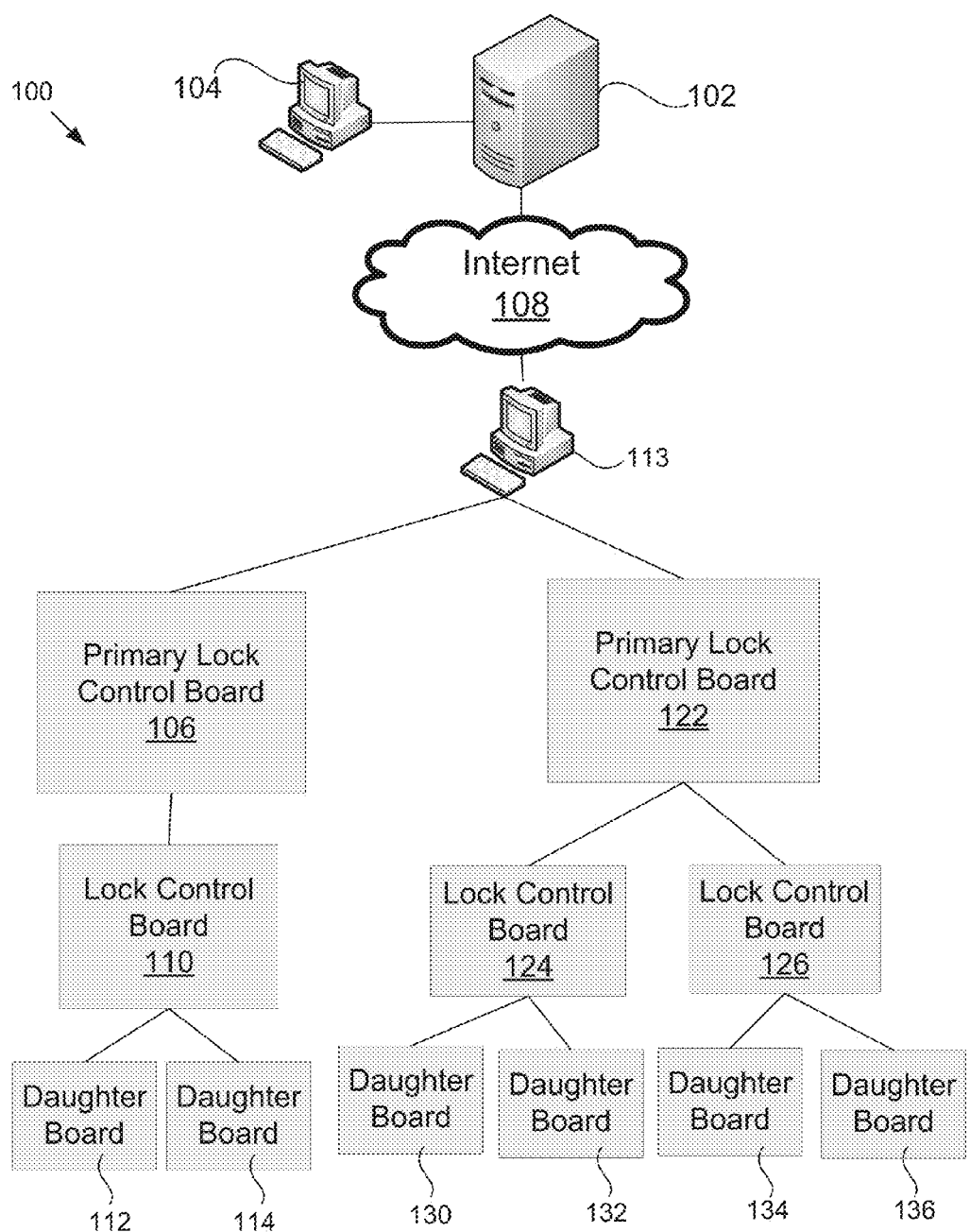
FIG. 2 illustrates the modular system of FIG. 1 with additional components, such as a kiosk computer.

As shown in FIG. 2, the modular system 100 may include a kiosk computer 113, which operates locally to facilitate communications between PLCB 106, PLCB 122, and the system server 102. The kiosk computer 113 may also be a server and/or may operate one or more user input devices, such as a touch screen, keyboard, mouse, RFID reader, etc. In some embodiments, the kiosk computer 113 is integrated into a kiosk or other device for user interaction.

In some embodiments, PLCB 106 performs similar or identical functions with respect to its LCB 110 as PLCB 122 performs with respect to its LCBs 124, 126. In other embodiments, each PLCBs 106, 122 perform different functions than another PLCB with respect to its LCBs, which allows the modular system 100 to offer a variety of goods and services under a variety of conditions. Exemplary functions that may be performed by the PLCBs are described below in more detail.

Still referring to FIG. 2, the LCBs 110, 124, 126 each communicate with their respective Daughter Boards 112, 114, 130, 132, 134, 136. In some embodiments, each LCB performs similar or identical functions with respect to (or in conjunction with) its Daughter Boards than another LCB with respect to (or in conjunction with) its Daughter Boards. In other embodiments, each LCB performs different functions with respect to (or in conjunction with) its Daughter Boards than another LCB with respect to (or in conjunction with) its Daughter Boards, which allows the modular system 100 to offer a variety of goods and services under a variety of conditions. Exemplary functions that may be performed by the LCBs and Daughter Boards are described below in more detail.

Figure 3:
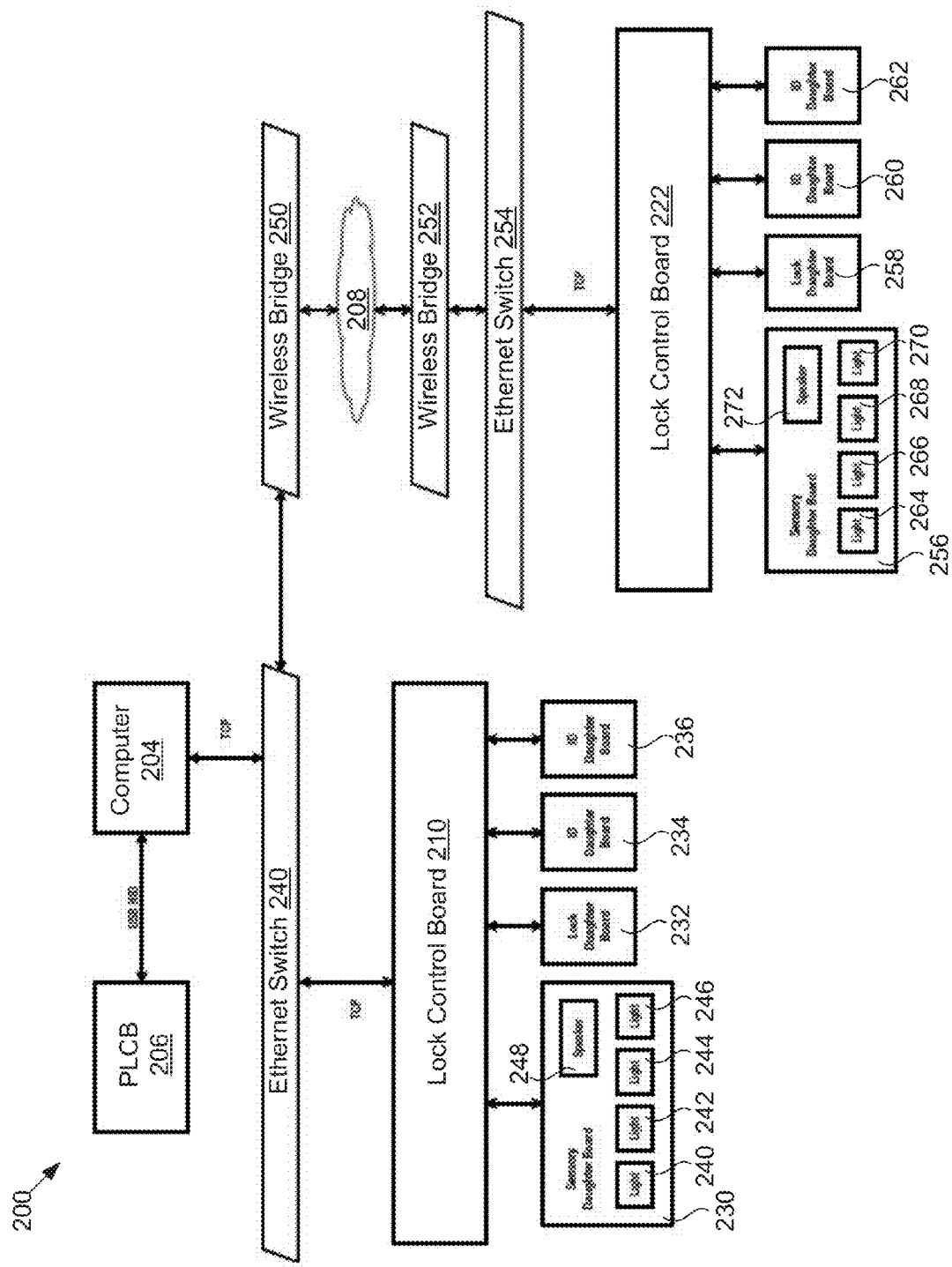
FIG. 3 illustrates a second modular system for facilitating automated transactions, according to embodiments of the present invention.
Figure 4:
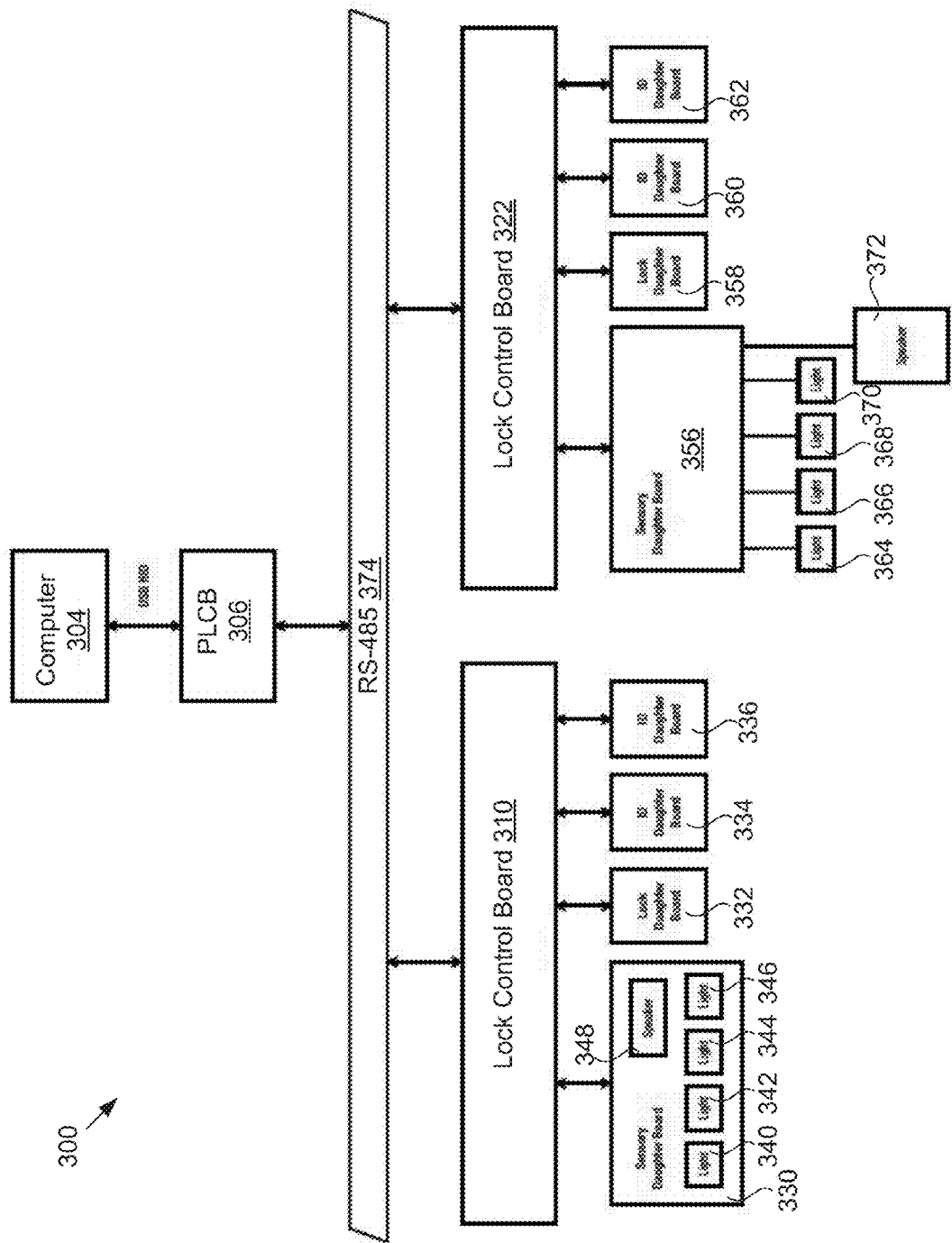
FIG. 4 illustrates a third modular system for facilitating automated transactions, according to embodiments of the present invention.

FIGS. 3 and 4 illustrate embodiments that use particular protocols to communicate between components of a modular system. Nevertheless, it is intended that other protocols could be used, such as ATM, RS-232, or any other known communications protocol. In other words, the communication protocols provided herein are merely examples and are not intended to be limiting.

Referring to FIG. 3, a modular system 200 includes a PLCB 206 that communicates with a computer 204 using a USB HID (Universal Serial Bus Human Interface Device) connection. In some embodiments, the computer 204 could be a server (e.g., system server 102 in FIG. 1) or a kiosk computer (e.g., kiosk computer 113 in FIG. 2). The computer 204 communicates with a switch (e.g., Ethernet switch 240) using TCP protocols. The Ethernet switch 240 communicates with the LCB 210 using TCP protocols. The LCB 210 communicates with four Daughter Boards, 230, 232, 234, 236, which may be incorporated into a docking module.

Daughter Board 230 is a Sensory Daughter Board 230 that includes lights 240, 242, 244, 246 and a speaker 248. As described below in more detail, these lights and speaker may be used to direct a user's attention to a particular docking module. While FIG. 3 illustrates four lights and one speaker, other communicative mechanisms are contemplated and more or less than five communicative mechanisms may be used. In some embodiments, the light/lights of a Sensory Daughter Board may be incorporated into a screen to visually communicate information to a user. In some embodiments, the Sensory Daughter Board 230 controls multiple LEDs and the Sensory Daughter Board has the ability to turn individual LEDs on and off and/or blink individual LEDs at a specific interval. In some embodiments, the Sensory Daughter Board 230 controls any number of LEDs with each LED directly connected to the Sensory Daughter Board 230. In other embodiments, the LEDs and/or speaker are pluggable through an IDC connection for remote installation. The speaker 248, in some embodiments, has the ability to sound a buzzer for a specified interval or emit other predetermined sounds or music for a predetermined period of time. The speaker 248 may be directly connected to the Sensory Daughter Board 230.

Daughter Board 232 is a Lock Daughter Board 232 and operates a locking mechanism in a docking module. For example, the Lock Daughter Board 232 may supply power to engage or disengage a locking mechanism in the docking module. In some embodiments, the Lock Daughter Board 232 also maintains and reports the state of the lock (e.g., transmits data indicating whether a locking mechanism is currently engaged in a locked or unlocked configuration). Daughter Boards 234, 236 are ID daughter boards 234, 236 that receive input, for example, by reading an RFID chip. ID Daughter Boards 234, 236 may use one of any number of wireless identification technologies, such as RFID, NFC, etc.

Still referring to FIG. 3, the Ethernet switch 240 communicates with a wireless bridge 250, which in turn communicates with a network 208, such as the Internet. A second wireless bridge 252 communicates with the network 208 and with a second switch (e.g., Ethernet switch 254), which communicates with LCB 222. LCB 222, like LCB 210, includes several Daughter Boards, such as a Sensory Daughter Board 256 (operating lights 264-270 and speaker 272), Lock Daughter Board 258, and ID Daughter Boards 260, 262.

Referring now to FIG. 4, a modular system 300 includes a computer 304 in communication with a PLCB 306 using a USB HID connection. In some embodiments, the computer 304 could be a server (e.g., system server 102 in FIG. 1) or a kiosk computer (e.g., kiosk computer 113 in FIG. 2). The PLCB 306 communicates with one or more LCBs (e.g., LCB 310 and LCB 322) using a connection based on RS-485. Each LCB includes connections to multiple Daughter Boards (i.e., LCB 310 is connected to Daughter Boards 330-336 and LCB 322 is connected to Daughter Boards 356-362). In this manner, various components of the modular system 300 may communicate in a "daisy-chain" like configuration. In FIG. 4, the LCBs 310, 322 and Daughter Boards 330-336 and 358-362 are similar to the LCBs 210, 222 and Daughter Boards 230-236 and 258-268 in FIG. 3. However, the Sensory Daughter Board 356 is different than Sensory Daughter Board 256 in that the lights 364-370 and sensor 372 are not incorporated into the Sensory Daughter Board 356. Instead, those communicative mechanisms are external to the Sensory Daughter Board 356. For example, the communicative mechanisms may be located on external surfaces of a docking module to facilitate user interaction.

In some embodiments, each board (PLCB, LCB, Daughter Boards) has connections that are uniquely configured while in other embodiments groups of connections are key-based, for example, with groups of connections with the same functionality having the same configuration or key.

In some embodiments, the fuses in the modular system (e.g., modular system 100) are field-replaceable or self-healing. The components of the modular system may be arranged so that there is ample space around each connection for easy removal. In some embodiments, the connectors support IDC connection technology. In some embodiments, the data cables and power cables in a modular system are separate, for example, with data cables using RJ-45 connections and running over CAT 6 cabling and with power cables using two wires (e.g., 12 AWG) with a power cable header of 1-350942-0.

Exemplary Component Operations

As discussed above, in various embodiments each component of a modular system (e.g., modular system 100) may perform certain functions or execute particular operations. While reference is primarily made to components illustrated in FIGS. 1 and 2 (i.e., modular system 100), it is intended that the exemplary operations described below could be performed, either alone or in combination, by various components in various embodiments of the modular system.

In some embodiments, the modular system 100 is used to facilitate automated rentals. Specifically, in those embodiments the modular system 100 interfaces with a user, releases an item into the user's possession, and/or receives an item when the user is finished. For example, some embodiments the modular system is used to rent goods (e.g., tools, though other goods such as equipment, vehicles, etc. may also be used in a system, either alone or in combination). In those embodiments, LCB 110 and/or Daughter Boards 112, 114 are incorporated into a docking module (e.g., docking module 500 in FIG. 5). Specific examples of the docking module and how the LCB 110 and daughter boards 112, 114 operate with respect to the docking module are discussed below in more detail.

The docking module includes a locking mechanism that secures (e.g., locks) a particular tool (e.g., a drill) to the docking module. The docking module is secured at the site, for example, using a security cable (e.g., a hardened steel cable) to attach the docking module to a building or to another secure structure. In some embodiments, the docking module may be free hanging with the security cable and a data cable coupling the docking module to the secure structure. If the cable is cut or disconnected from the docking module, an alarm may sound. In other embodiments, the docking modules are integrated into the secure structure (e.g., mounted into a wall of a building). The modular system 100 may include any number of docking modules to offer a variety of goods.

The PLCB 106 is incorporated into a kiosk or is in communication with a kiosk. That kiosk includes one or more user input mechanisms, such as touch screens, keyboards, RFID readers, etc, as well as a kiosk computer 113 and/or a system computer 104. The kiosk may operate in a power-down or sleep mode until user input (e.g., contacting a touch screen or pressing a button) transmits a signal to "wake-up" the kiosk.

The customer begins the transaction by interfacing with the kiosk (e.g., using a touch screen). The customer enters personal information (name, email, billing information, etc.) and selects a desired good, for example, a drill. The PLCB 106 receives a signal conveying the customer's selection and identifies a docking module holding a drill. In some embodiments, the PLCB 106 identifies the docking module using a database maintained at the kiosk. In other embodiments, the PLCB 106 may look to a database maintained external to the kiosk (e.g., by the server 102). In yet other embodiments, the PLCB 106 may poll the LCBs to identify docking modules with a drill. Once the PLCB 106 has identified an appropriate docking module, it transmits a signal to the LCB 110 of the docking module.

In some embodiments, the LCB 110 receives the signal from the PLCB 106, processes that signal, and transmits particular messages to its daughter boards 112, 114 based on the signal from the PLCB 106. For example, the LCB 110 may instruct a Sensory Daughter Board (e.g., Sensory Daughter Board 330 in FIG. 4) to activate communicative mechanisms on the docking module, such as lights or speakers, to help the customer locate the correct docking module. The LCB 110 may instruct a Lock Daughter Board (e.g., Lock Daughter Board 332 in FIG. 4) to disengage a locking mechanism securing the drill to the docking module. The user is then able to remove the drill from the docking mechanism.

In some embodiments, when the user has finished using the drill, the user may simply reinsert the drill (or a component attached to the drill) into a docking module. As described below in more detail, in some embodiments the docking module (e.g., via one or more Daughter Boards) detects the return of the drill and engages a locking mechanism to secure the drill and may identify the particular drill using, for example, RFID technology. The LCB 110 receives data regarding the return of the drill and transmits that data to the PLCB 106, which may forward the data to a kiosk computer 113, system computer 104 and/or system server 102.

In some embodiments, the modular system 100 maintains a database of customer transactions. For example, when the user selects the good (e.g., the drill), the PLCB 106, computer 112, system server 102, and/or system computer 104 creates an entry in a database containing, e.g., a user identification, an identifier for the drill, a time stamp for when the tool was removed, billing information for the user, and/or other information pertinent to the transaction. When the drill is returned, the PLCB 106 (in conjunction with its Daughter Boards) generates data indicating that the drill was returned and when the drill was returned. The database is then updated with that information. The rental entry may then be processed (e.g., by the system server 102) for billing. The database may also be used to identify the locations of particular goods (i.e., the docking modules currently securing those particular goods).

In some embodiments, the modular system 100 is used to facilitate automated sale of goods in, e.g., a vending-locker system. In those embodiments, an identifier, for example an RFID chip, is located on an item (e.g., within a vase containing flowers) placed in a locker in the vending-locker system. A Daughter Board (e.g., ID Daughter Board 334) reads the RFID chip and transmits the identifier to the LCB 110, which forwards the information to the PLCB 106. The PLCB 106, either alone or in combination with a kiosk computer 113, system computer 104, and/or system server 102, matches the identifier to an entry in a database to determine what product is located in that locker. Correctly identifying the product allows the system 100 to convey the correct information (e.g., price) to a user seeking to purchase that item. Once the item is purchased (e.g., using the kiosk or through an Internet website), the PLCB 106 transmits a signal to the corresponding LCB 110, which will disengage the locking mechanism on the locker door using a Lock Daughter Board.

In some embodiments, the modular system 100 is used to facilitate automated rental of services, such as, for example, renting a ski locker. In those embodiments, the LCB 110, using a Lock Daughter Board, controls a locking mechanism on the locker door. A user interacts with a kiosk, which may include the PLCB 106, to rent the ski locker. Once the rental is approved, the kiosk records the user identifier and a locker identifier in a database. When the user wishes to access the locker, he or she enters her user identifier into the system. For example, an ID Daughter Board equipped to read RFID chips is placed adjacent to the locker door. The user places his or her RFID chip near the ID Daughter Board. The ID Daughter Board transmits the user identifier read from the RFID chip to the LCB 110, which passes the data to the PLCB 106. The PLCB 106 verifies the user identifier and locker number against the database. If the entries match, the PLCB 106 instructs the LCB 100 to open the locker. The Lock Daughter Board 112 is then used to engage/disengage the locking mechanism and to record time entries indicating when the locker was locked or unlocked.

In some embodiments, the user submits identifying information, billing information, or other required information to the system server 102 over the Internet. For example, the user may transmit information using a smart-phone or computer. The system server 102 authorizes the sale/rental, identifies an appropriate docking module for that user, and/or transmits a signal to the PLCB 106 for that docking module. The PLCB 106 receives that signal and instructs the LCB 110 to allow the user to access the goods/services that he or she has purchased.

In some embodiments, the kiosk is configured to receive a user identifier using RFID technology, Near-field communications, laser/barcode technology, or any other data entry mechanism. The kiosk may access user records, for example, in a database maintained at the kiosk or at a remote location, to identify a customer associated with that user identifier. In other embodiments, the modular system does not employ a kiosk. Instead, the PLCB 106 uses an ID Daughter Board to receive a user identifier and initiate the transaction. Those embodiments are useful when the goods are identical, such that the user does not need to select a particular good from a variety of sources and so no additional user input is required.

Exemplary Docking Modules

In some embodiments, the modular system 100 includes one or more docking modules, which may incorporate components such as the LCB 110 and/or the Daughter Boards 112, 114. In the embodiments shown in FIGS. 5-7, a docking module 500 includes a cable 510 that secures the docking module 500, for example, by coupling the docking module to a building. The cable 510, in some embodiments, carries power to the docking module 500 and/or data to and from the docking module 500. The cable 510 could include both a security cable and a data cable that are independent cables. As mentioned above, in some embodiments the modular system 100 triggers an alarm if the cable 510 is severed.

Figure 5:
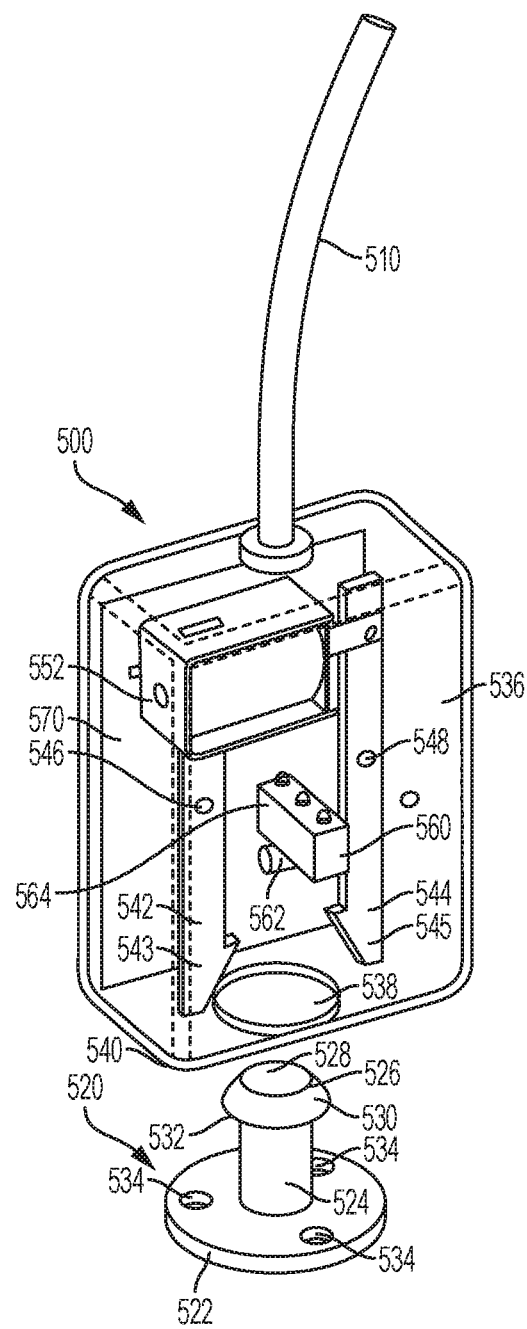
FIG. 5 illustrates a perspective view of a docking module and a latching body, according to embodiments of the present invention.
Figure 6:
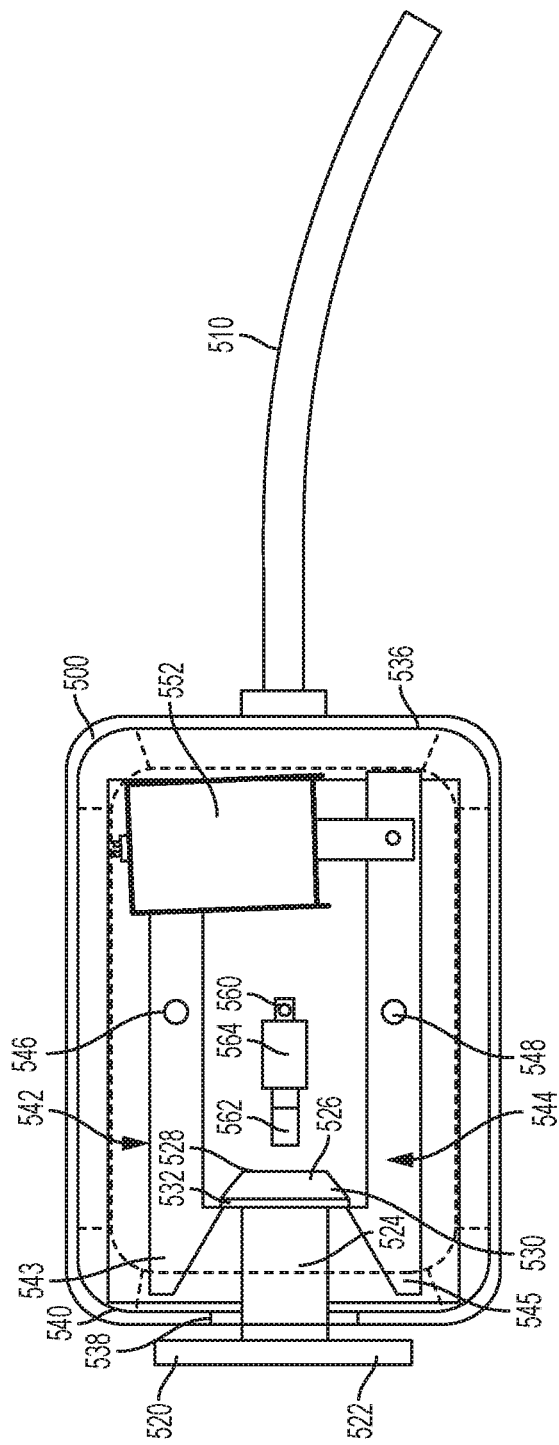
FIG. 6 illustrates a side view of the docking module and latching body of FIG. 5.

In some embodiments, the docking module 500 receives a latching body 520 and selective secures the latching body 520 within the docking module 500. As shown in FIG. 5, the latching body 520 includes a latch base 522, a latch neck 524, and a latch head 526. The latch head 526 includes an upper head surface 528, a side head surface 530, and a lower head surface 532. The upper head surface 528 is generally parallel to the lower head surface 532. The side head surface 530 is sloped with respect to the upper head surface 528 and the lower head surface 532 to facilitate a locking engagement with the docking module. The latch base 522 is secured to the item to be sold or rented (e.g., the drill). For example, the latch base 522 in FIG. 5 includes three screw holes 534 that can be used to secure the latch base 522 to the item. Other attachment mechanisms, such as adhesive, welding, etc., may also be used. While the latch base 522 in FIG. 5 is a flat disc, other shapes and sizes are envisioned. For example, the latch base 522 may be shaped to match a corresponding surface on the item to which it is attached. The latching body 520 may be coupled to the item either through a rigid attachment or through a floating attachment.

Still referring to FIG. 5, the docking module 500 includes an outer casing 536 that may be formed of a hard plastic, metal, fiberglass-filled nylon, or other similar materials. The outer casing 536 may include some metal components as long as that metal does not interfere with any identification sensors. The outer casing 536 defines a rectangular prism with an aperture 538 in a bottom section 540 of the outer casing 536 through which the latch head 526 may pass. In other embodiments, the outer casing 536 forms other shapes according to the particular spatial requirements of the modular system 100 and/or its surroundings.

Within the outer casing 536 is a left jaw 542 and a right jaw 544, which pivot about a left jaw midpoint 546 and a right jaw midpoint 548, respectively. The left jaw 542 (specifically a lower head portion 543 of the left jaw 542) and the right jaw 544 (specifically a lower head portion 545 of the right jaw 544) form a jaw latch that, when in a locked position (see FIG. 6), engages the lower head surface 532 of the latching body 520 and secures the latching body 520. To move the jaw latch between a locked and unlocked position, the docking module 500 includes a motor or solenoid 552. In some embodiments, the jaw latch is in the locked position when the solenoid 552 is unpowered and moves into the unlocked position only when the solenoid 552 receives power (e.g., from a Lock Daughter Board). In other embodiments, the jaw latch is in the unlocked position when the solenoid 552 is unpowered and moves into the locked position only when the solenoid 552 receives power (e.g., from a Lock Daughter Board). In other embodiments, the latching body 520 includes a ring and the locking mechanism within the docking module is a trunk lock. A variety of locking configurations may be used to secure the latching body 520 to the docking module.

Figure 7:
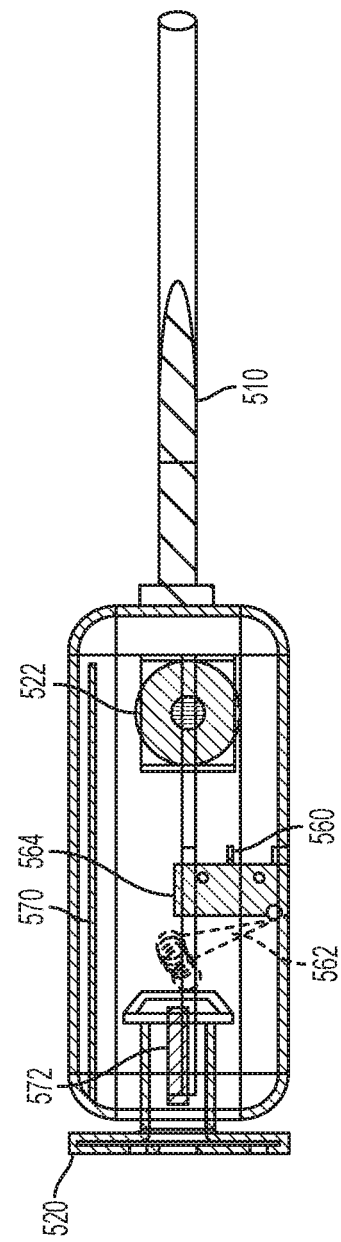
FIG. 7 illustrates a cut-away lateral side view of the docking module and latching body of FIG. 5.

The docking module 500 also includes a plug seated sensor 560. In some embodiments, and as best shown in FIG. 7, the plug seated sensor 560 includes a sensor arm 562 pivotally coupled to the seat 564. When the latching body 520 enters the docking module 500, the upper head surface 528 contacts the sensor arm 562 and moves it toward the seat 564. The plug seated sensor 560 detects the sensor arm movement and sends a signal to a Daughter Board, for example, an ID Daughter Board. The ID Daughter Board then activates an identifier sensor 570, such as an RFID sensor, that reads an RFID chip 572 embedded within the latching body 522. By activating the identifier sensor 570 only when the latching body 522 is within the docking module 500, the modular system 100 conserves power. In addition, the ID Daughter Board may be configured to activate the identifier sensor 570 only once each time a latching body 522 is removed from and/or returned to the docking module 500. Specifically, the ID Daughter Board will turn on the identifier sensor 570, which then searches for an identifier (e.g., via an RFID chip). When the identifier sensor 570 senses a return signal, it transmits that signal to the ID Daughter Board, which forwards the signal to its LCB. The LCB may verify the signal itself, or it may forward the signal to the PLCB or other system components for verification. Once the signal is verified as a user identification, the ID Daughter Board turns the identifier sensor 570 off. Thus, the ID Daughter Board is configured to operate the identifier sensor 570 until a received user identifier is verified, at which point it turns off the identifier sensor 570 to conserve power.

Figure 8:
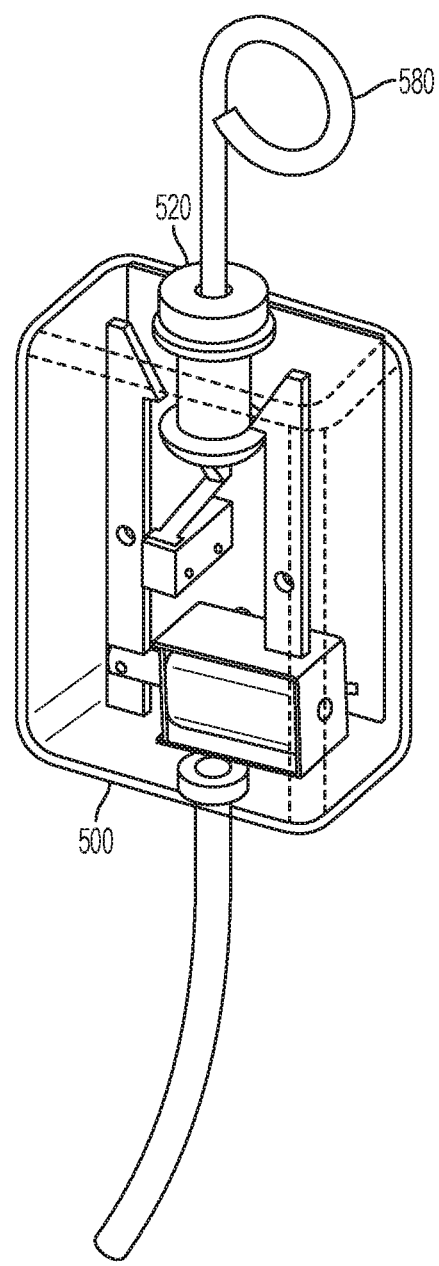
FIG. 8 illustrates a perspective view of a docking module and a second latching body, according to embodiments of the present invention.

In the embodiments shown in FIG. 8, the latching body 522 is coupled to a latching cord 580. The latching cord 580 secures the latching body 522 to an item, for example, by looping the latching cord 580 around the item (or part of the item) and closing the loop (e.g., with a crimp).

Figure 9:
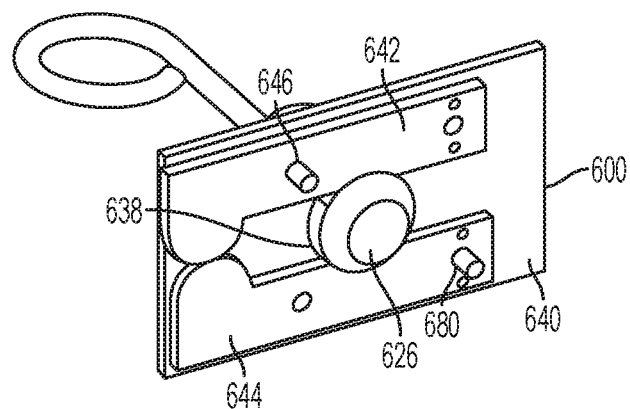
FIG. 9 illustrates a perspective view of some components of a second docking module, according to embodiments of the present invention.

FIG. 9 illustrates a cut-away view of a docking module 600 in which the latching head 626 passes through an aperture 638 in a side section 640 of the docking module 600. Specifically, the docking module 600 forms a rectangular prism and the aperture 638 is in the middle of a side section 641 of the docking module 600. Also in FIG. 9, the left jaw 642 and the right jaw 644 pivot at different points. Specifically, the left jaw 642 pivots about a midpoint 646 while the right jaw 644 pivots at an upper point 680.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A modular system for securing goods or services, the modular system comprising:
    a primary lock control board that includes a network adapter coupled to a communications network;
    a lock control board located remote from the primary lock control board, wherein the lock control board is configured to receive instructions from the primary lock control board through the communications network; and
    a sensory daughter board coupled to the lock control board, the sensory daughter board including user-perceivable indicators;
    a lock daughter board coupled to the lock control board, the lock daughter board including a locking mechanism that selectively releases and secures a tangible item; and
    an ID daughter board coupled to the lock control board and located proximate to the lock daughter board, the ID daughter board configured to obtain and transmit to the primary lock control board via the lock control board identification information obtained from the tangible item;
    wherein the lock control board is further configured to control the sensory daughter board in order to selectively activate and deactivate the user-perceivable indicators; and
    wherein the primary lock control board is configured to instruct the lock control board to selectively release and secure the tangible item via the lock daughter board.

2. The modular system of claim 1, further comprising a docking module in which the sensory daughter board, the lock daughter board, and the ID daughter board are integrated, the docking module including an aperture into which a portion of the tangible item is inserted, wherein the locking mechanism selectively releases and secures that portion of the tangible item.

3. The modular system of claim 2, wherein the user-perceivable indicators include lights and wherein the primary lock control board is configured to instruct the lock control board to activate and deactivate the lights in order to identify the docking module securing the tangible item.

4. The modular system of claim 2, wherein the locking mechanism of the lock daughter board is configured to selectively release and secure a latching body coupled to the tangible item, the latching body including an RFID chip; wherein the ID daughter board includes an RFID reader to obtain identification information from the RFID chip regarding the tangible item; and wherein the ID daughter board is positioned within the docking module at a location where the RFID reader interacts with the RFID chip when the latching body is secured by the locking mechanism of the lock daughter board.

5. The modular system of claim 1, wherein the primary lock control board is configured to determine a level of power to send to the lock control board.

6. A modular locking system for controlling access to a variety of goods and services, the modular locking system comprising:
    a kiosk configured to receive transaction information from a user, wherein the kiosk includes a primary lock control board and the transaction information includes a desired tangible good;
    a first docking module that includes a first lock control board, a first lock daughter board, and a first ID daughter board;
    a second docking module that includes a second lock control board, a second lock daughter board, and a second ID daughter board;
    wherein the first lock daughter board and the second lock daughter board are each configured to selectively lock and release a tangible good at the first and second docking module, respectively, wherein selectively locking and releasing the tangible good includes selectively locking and unlocking a portion of the tangible good;
    wherein the first ID daughter board and the second ID daughter board are each configured to identify the tangible good locked at the first and second docking modules, respectively, using the portion of the tangible good; and
    wherein the primary lock control board at the kiosk is configured to:
        receive identification information from the first ID daughter board and the second ID daughter board that identifies a tangible good secured at their respective docking modules;
        use the identification information to determine at which docking module the desired tangible good is secured; and
        transmit instructions to the lock control board at the docking module at which the desired tangible good is secured to operate the connected lock daughter board to release the desired tangible good.

7. The modular locking system of claim 6, wherein the primary lock control board is configured to poll each docking module in order to receive the identification information.

8. The modular locking system of claim 7, wherein the primary lock control board is configured to poll each docking module in response to receiving the transaction information.

9. The modular locking system of claim 6, wherein the kiosk is operatively coupled to an external database in which the identification information from each ID daughter board is stored, and wherein the primary lock control board is configured to obtain the identification information from the external database.

10. The modular locking system of claim 6, wherein the kiosk is configured to access the identification information from the first and second ID daughter boards and to convey, to a user, tangible goods associated with the identification information.

11. The modular locking system of claim 6, wherein the kiosk is configured to receive the transaction information from the user using a communications network, wherein the user is remote from the kiosk but is located proximate to the first docking module.

12. The modular locking system of claim 11, wherein the first docking module is located remote from the second docking module, and wherein the kiosk is configured to determine which docking module is closer to the user and to direct the user to that docking module.

13. The modular locking system of claim 6, wherein the first lock control board, the first lock daughter board, the first ID daughter board, the second lock control board, the second lock daughter board, and the second ID daughter board are configured to communicate through a daisy-chain like configuration.

* * * * *